United States Patent [19]

Suzuki

[11] Patent Number: 4,641,937
[45] Date of Patent: Feb. 10, 1987

[54] SELF-TIMER DEVICE FOR A CAMERA
[75] Inventor: Nobuyuki Suzuki, Kanagawa, Japan
[73] Assignee: Canon Kabushiki Kaisha, Tokyo, Japan
[21] Appl. No.: 712,335
[22] Filed: Mar. 14, 1985

Related U.S. Application Data

[63] Continuation of Ser. No. 622,536, Jun. 20, 1984, abandoned, which is a continuation of Ser. No. 407,052, Aug. 11, 1982, abandoned.

[30] Foreign Application Priority Data

Aug. 18, 1981 [JP] Japan .................... 56-129173
Dec. 17, 1981 [JP] Japan .................... 56-204954
Dec. 17, 1981 [JP] Japan .................... 56-204955
Dec. 17, 1981 [JP] Japan .................... 56-204957
Dec. 17, 1981 [JP] Japan .................... 56-204958
Dec. 17, 1981 [JP] Japan .................... 56-204959

[51] Int. Cl.$^4$ ............... G03B 17/18; H03G 3/24
[52] U.S. Cl. ................ 354/238.1; 354/289.1; 354/467; 381/57; 340/384 E
[58] Field of Search ........ 354/238.1, 467, 289.1, 354/289.12, 474; 381/57; 340/75, 384 E, 815.11, 815.21, 815.22; 116/213

[56] References Cited

U.S. PATENT DOCUMENTS 3,133,990 5/1964 Seeley .................... 381/57
3,304,368 2/1967 Ford et al. ............... 381/57
3,410,958 11/1968 Cohen .................... 381/57
3,934,085 1/1976 Munson et al. ............ 381/57
4,047,377 9/1977 Banks, Jr. ............... 340/384 E X
4,061,874 12/1977 Fricke et al. ............. 381/57
4,198,141 4/1980 Tominaga et al. .......... 354/474
4,272,176 6/1981 Maitani et al. ........... 354/238.1
4,322,146 3/1982 Shimizu et al. ........... 354/289.1 X
4,342,023 7/1982 Tsunoda et al. ........... 381/57 X
4,424,511 1/1984 Alberto, Jr. ............. 381/57 X
4,462,669 7/1984 Suzuki .................... 354/289.12 X Primary Examiner—William B. Perkey
Attorney, Agent, or Firm—Toren, McGeady & Goldberg

[57] ABSTRACT

A self-timer device which announces its operation with sounds, and in which the sound volume or loudness changes in accordance with environmental sound or exterior noise around the camera so as to always tell the operator with a proper sound that the self-timer is in operation.

15 Claims, 13 Drawing Figures (a)

(b)

(c)

(a)

(b)

SELF-TIMER DEVICE FOR A CAMERA

This is a continuation of application Ser. No. 622,536, filed June 20, 1984, now abandoned, which in turn is a continuation of Ser. No. 407,052, filed Aug. 11, 1982, now abandoned.

BACKGROUND OF THE INVENTION

1. Field of the Invention:

The present invention relates to self-timer devices for cameras, particularly such devices using a sound generator for announcing the operation of the self-timer, in which the sound volume or loudness changes in accordance with environmental sound or a noise near the object and the camera.

2. Description of the Prior Art:

Cameras are conventionally known, in which a sound generator is used for announcing the operation of a self-timer in such a manner that the user recognizes by the sound that the self-timer is in operation. However, in such cameras, since the volume or the loudness of the sound generated by the sound generator is constant, a problem is that it is hard to hear the sound generated by the sound generator due to the masking effect of sounds when the ambient noise or environmental sound is loud and when the distance to the object (the user) is great. On the other hand, when a loud sound is produced in a quiet place, not only is it troublesome to others but also to the user making it difficult to take a natural photograph.

In order to overcome the above problems, the sound volume or loudness of the sound generator is changed by means of a switch. However, the proposal is not sufficiently effective, particularly when the volume or loudness of ambient noise or environmental sound changes while the self-timer is in operation or when the user forgets to change the volume.

It is, accordingly, an object of the present invention to provide an improved self-timer device for a camera which overcomes the disadvantages of the prior art device.

It is another object of the invention to provide a self-timer device which detects the volume or loudness of ambient noise or environmental sound even when the volume or loudness changes during the operation of the self-timer and which automatically controls the sound volume or loudness of the sound generator in accordance with the amount and informs the user with a proper sound volume or loudness so that the self-timer device is in operation.

It is a further object of the invention to provide a self-timer device which detects the volume or loudness of sound around the camera, compensates the detected signal by means of an audibility compensating circuit and changes the sound volume or loudness of the sound generator in accordance with the compensated signal to control the amount of the sound generator sound correctly.

It is a further object of the invention to provide a camera display device which detects the amount of ambient noises or environmental sounds around the camera and controls the volume or loudness of the sound of the sound generator accurately in accordance with the detected amount, and which when the noise level is too high to recognize the sound generator sound, stops sound generation by the sound generator and starts the display of the self-timer operation by a light emitting element.

It is a further object of the invention to provide a camera display device which detects the amount of environmental sound or noise around the camera with the sound generator, while the sound generator stops generating the sound and changes the loudness or volume of the sound generator sound continuously in accordance with the detected amount.

It is a further object of the invention to provide a camera self-timer device which detects the amount of environmental sound or noise around the camera and changes the loudness or volume of the sound generator sound in relation to the detected amount and the distance between the camera and the object.

It is a further object of the invention to provide a display device for a camera which detects the amount of environmental sound or noise around the camera and stops the sound generation when one of the detected amounts and/or the distance between the camera and the object surpasses a certain limit between the camera and the object surpasses a certain limit value. This causes a light emitting element to display the self-timer operation.

These and further objects and features of the present invention will become apparent from the following detailed description of embodiments thereof made with reference to the accompanying drawings.

BRIEF DESCRIPTION OF THE DRAWINGS

FIG. 4(a) shows the relation when the release button is locked.

DESCRIPTION OF THE PREFERRED EMBODIMENTS

Figure 1:
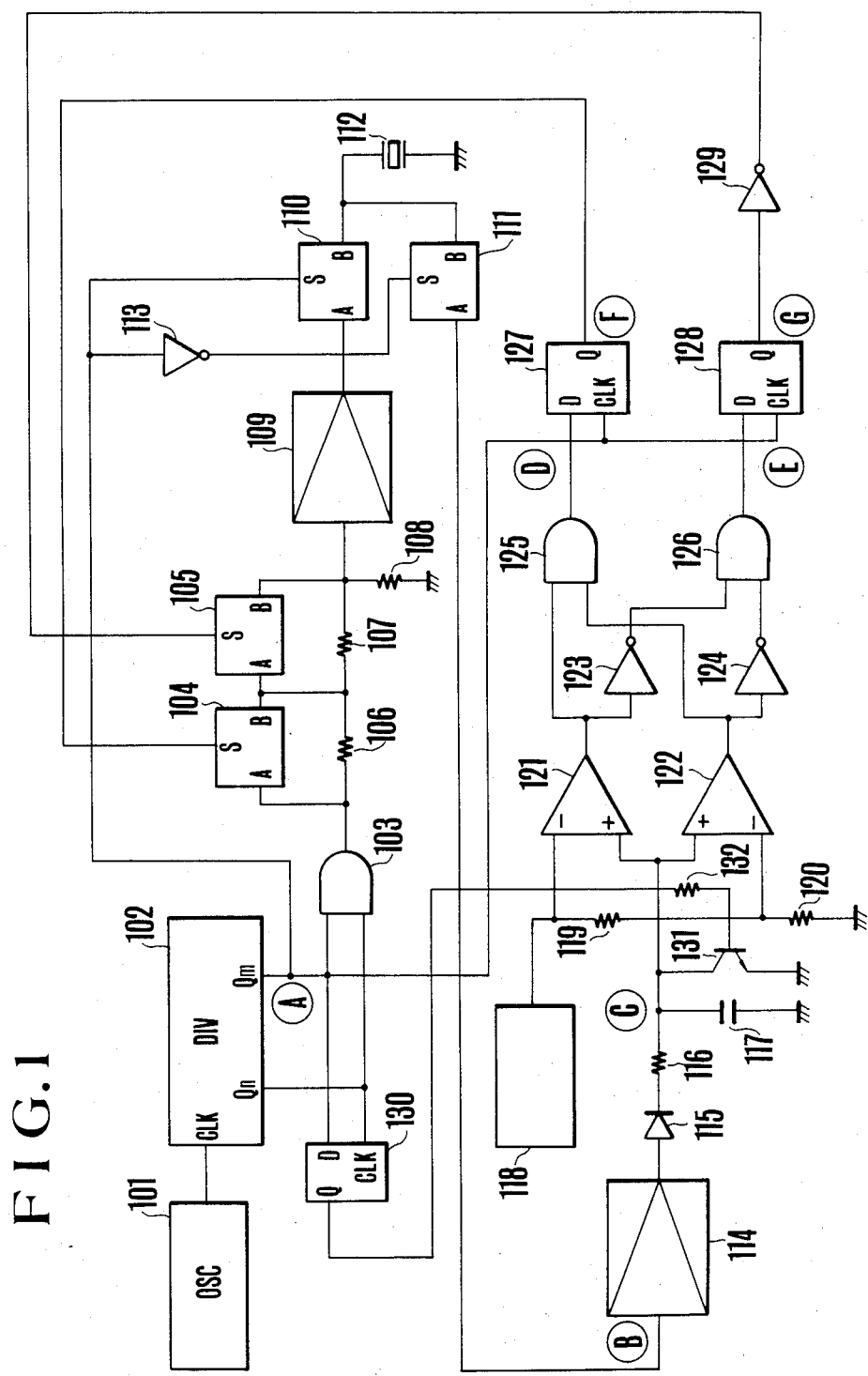
FIG. 1 shows a block circuit of the first embodiment of the self-timer device of the present invention.

FIG. 1 shows a block circuit diagram of the first embodiment of the self-timer of the present invention. A clock pulse generator is identified by the reference numeral 101 and a frequency divider 102 has a CLK terminal to which the clock pulse is delivered from the generator 101 and on whose Qn and Qm terminals the outputs of different divided frequencies are delivered. Numeral 103 identifies an AND circuit and numerals 104 and 105 identify analogue switches, each having A and B terminals which are short-circuited when the level at the S terminal thereof is high. Numerals 106, 107 and 108 identify resistors. Both terminals of the resistor 106 are connected to the A and B terminals of the analogue switch 104, while the resistor 108 is connected between the resistor 107 and the ground. An amplifier 109 has a gain which is sufficient for driving a sound generator 112. Analogue switches 110 and 111 have operations which are the same as those of the analogue switches 104 and 105, whose B terminals are connected to one terminal of the sound generator 112. The analogue switch 110 is connected to the output terminal of the amplifier 109 and the analogue switch 111 is connected to the input terminal of the amplifier 114. The sound generator 112 produces a sound when an intermittent voltage is applied to the sides and a voltage corresponding to the sound intensity applied on the sides in the opened state. Alternatively, the voltage can be applied to a speaker, a piezoelectric buzzer, and other devices. An inverter 113 inverts the output from the Qm terminal of the frequency divider. An amplifier with a high input impedance is illustrated by the reference numeral 114, where A and B terminals are short-circuited to connect the sound generator 112 to the amplifier 114 when the level at the S terminal of the analogue switch 111 is high. Because the input impedance of the amplifier 114 is high, the sound generator 112 is in the open state and the voltage produced with the sound generator 112 is amplified with the amplifier 114. Numeral 115 identifies a diode, numeral 116 a resistor and numeral 117 a condenser. The output of the amplifier 114 is detected as an average value with the above three elements. A constant voltage circuit 118 and resistors 119, 120 cooperate so that the voltage of the constant voltage circuit 118 is divided at the connecting point of the resistor 119 with the resistor 120. Voltage comparators are identified by reference numerals 121 and 122. The voltage comparator 121 compares the voltage of the constant voltage circuit 118 with the average value of the detected output voltage (the voltage at the connecting point of the resistor 116 with the condenser 117) to produce a high level output when the latter voltage is higher. The voltage comparator 122 compares the divided voltage of the constant voltage circuit (the voltage at the connecting point of the resistors 119 with 120) with the average value of the detected output to produce a high level output when the latter voltage is higher. Inverters 123 and 124 are for inverting the outputs of the voltage comparators 121 and 122. An AND circuit 125 produces the AND (the logical product) of the output of the voltage comparator 121 with the inverted output of the voltage comparator 122. An AND circuit 126 produces the AND of the inverted output of the voltage comparator 121 with the output of the voltage comparator 122. D type flip-flops 127 and 128 have CLK terminals to which the Qm terminal of the frequency divider 102 is connected. The output of the AND circuit 125 is connected to the D terminal of the D type flip-flop 127, while the output of the AND circuit 126 is connected to the D terminal of the D type flip-flop 128. The input levels applied to the D terminals of the D type flip-flops 127 and 128 are transferred to the respective Q terminals thereof with the rising of the pulse at the CLK terminals. An inverter 129 inverts the output at the Q terminal of the D type flip-flop 128 to control the analogue switch 105 via the S terminal. The Q terminal of the D type flip-flop 127 is connected to the S terminal of the analogue switch 104 to control the analogue switch 104.

A D type flip-flop 130 has a CLK terminal to which the Qn output of the frequency divider 102 is delivered and to whose D terminal the Qm output of the frequency divider 102 is delivered. As a result, the output at the Q terminal of the D type flip-flop 130 is delayed by half of the cycle of the pulse delivered from the Qm terminal in the output wave form at the Qm terminal of the frequency divider 102. A transistor 131 has an emitter which is grounded and whose collector is connected to the connecting point of the resistor 116 with the condenser 117. The base is connected to the Q terminal of the D type flip-flop 130 via a resistor 132. The resistor 132 is connected to the Q terminal of the D type flip-flop 130 and the base of the transistor 131.

Figure 2:
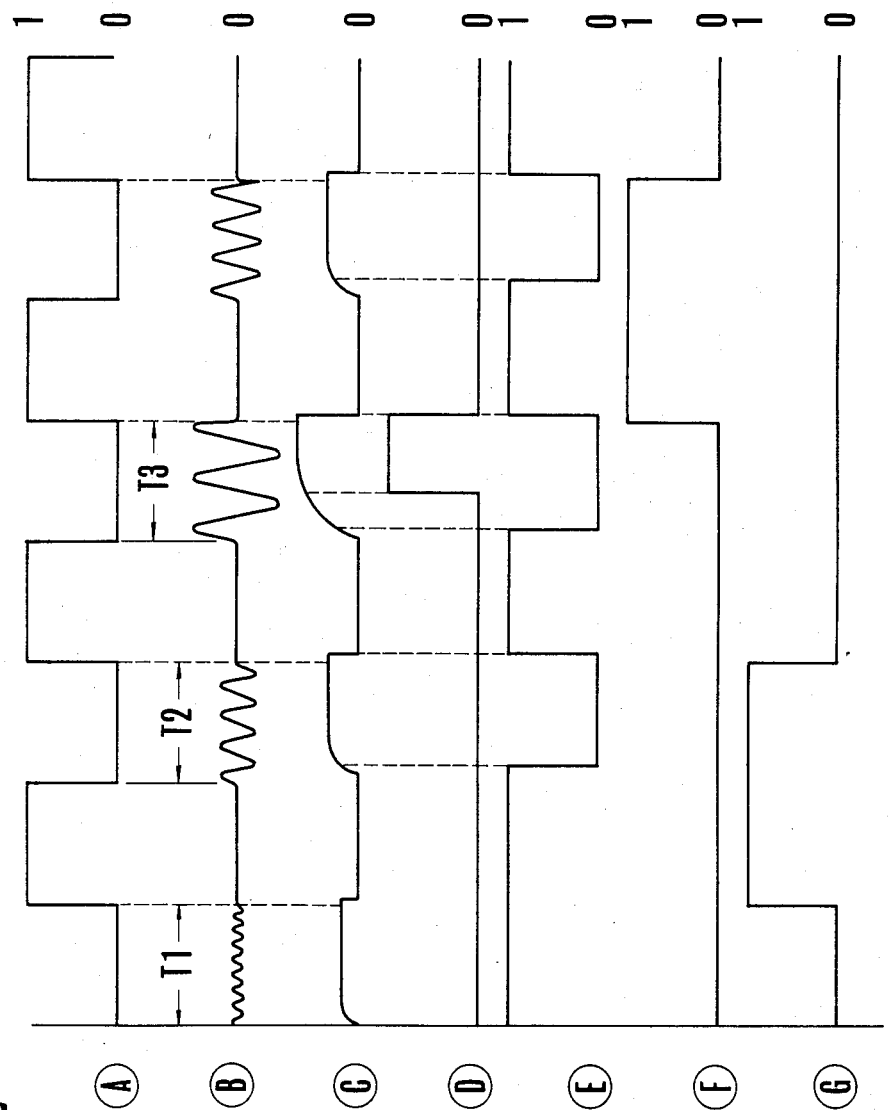
FIG. 2 shows the timing wave form for operation of the above embodiment.

The operation of the above construction, shown in FIG. 1, will be explained below in connection with FIG. 2. FIG. 2 shows the wave forms at (A)–(G) in the circuit shown in FIG. 1, whereby the 0 level in each wave form shows the low level, while the 1 level shows the high level. The horizontal axis shows the lapse of time.

When the output from the oscillator 101 is delivered to the CLK input terminal of the frequency divider 102, at the terminals Qn and Qm the outputs with divided frequency appear (for example an output with 1 KHz at the Qn terminal and an output with 1 Hz at the Qm terminal). When the level of output ((A) in FIG. 2) at the Qm terminal is low the level of output of the inverter 113 is high. The analogue switch 111 to whose S terminal the inverter is connected is in the conductive state, while the analogue switch 110 to whose S terminal the low level at the Qm terminal is connected is in the non-conductive state. Consequently, the sound generator 112 is connected to the amplifier 114 with a high input impedance via the analogue switch 111. At this time, the sound generator 112 is not driven as a sound generator but acts as a microphone in such a manner that environmental sound or noise around the sound generator is converted into voltage to be delivered to the amplifier 114 as the signal voltage (wave form (B) at T1, T2, T3 in FIG. 2). The signal voltage is proportional to the ambient noise or environmental sound. For example, at T1 in the wave form (B) in FIG. 2 the ambient noise or environmental sound is low, at T2 the ambient noise or environmental sound is moderate and at T3 the ambient noise or environmental sound is high. Thereafter the voltage is amplified with the amplifier 114 having a high input impedance and detected with the average value detecting circuit consisting of the diode 115, the resistor 116 and the condenser 117, whereby the wave form is as shown in FIG. 2 (C) at the connecting point of the resistor 116 with the condenser 117. The longer rising time at the beginning of T1, T2 and T3 is due to the time constant of the resistor 116 and the condenser 117. Then, the detected output is delivered to the negative input terminals of the voltage comparators 121 and 122 to be compared with the voltage of the constant voltage circuit 118 and the voltage divided with the resistors 119 and 120 of the constant voltage circuit. Accordingly, the voltage of the constant voltage circuit 118 and the voltage divided with the resistors 119 and 120 are properly connected with the output to be detected.

Three cases of ambient noise or environmental sound will be explained below.

(1) when the ambient noise or environmental sound is small (as at T1 in FIG. 2):

Because the detected output is lower than the voltage of the voltage constant circuit 118 and the divided voltage, the levels of output of the voltage comparators 121 and 122 are low. Thus, the level of output ((D) in FIG. 2) of the AND circuit 125 is low and the inverters 123 and 124 produce a high level signal so that the level of output ((E) in FIG. 2) of the AND circuit 126 is high. Thus, the level at the D terminal of the D type flip-flop 127 becomes low, while the level at the D terminal of the D type flip-flop 128 becomes high ((G) in FIG. 2). Furthermore, because the CLK terminals of the D type flip-flops 127 and 128 are connected to the Qm terminal of the frequency divider 102, the signal at the D terminal of the D type flip-flop appears at the Q terminal at the end of T1, namely at the time of the rising of the wave form (A) of the Qm terminal. Consequently, at the end of T1 the output level ((F) in FIG. 2) at the Q terminal of the D type flip-flop 127 is low and the level at the S terminal of the analogue switch 104 is also low so that there is no connection between the terminals A and B. Furthermore, the output level ((G) in FIG. 2) at the Q terminal of the D type flip-flop 128 is high, while the output level of the inverter 129 is low and the level at the S terminal of the analogue switch 105 is also low so that there is no connection between the terminals A and B.

The resistors 106, 107 and 108 constitute a voltage dividing circuit and the divided voltage of the output of the AND circuit 103 is delivered to the amplifier 109. On the other hand, to the input terminal of the AND circuit 103 are connected the terminals Qn and Qm of the frequency divider. However, the level at Qm remains high between the end of T1 and the beginning of T2, Qn delivering an output with 1 KHz, so that the AND circuit 103 delivers a pulse train which is intermittent with 1 KHz. Hereby, the output whose voltage is divided is delivered to the amplifier 109 to be amplified to an output sufficient for driving the sound generator 112. Furthermore, because the level at the S terminal of the analogue switch 110 is high from the end of T1 till the beginning of T2, the area between the terminals A and B of the analogue switch 110 is conductive, whereby the sound generator 112 is driven with the output of the amplifier 109 to produce a comparatively small noise with the basis frequency 1 KHz (divided with the voltage dividing ratio of the resostors 106, 107 and 108).

Furthermore, from the Q terminal of the D type flip-flop 130, the Qm output of the frequency divider 102 is delivered, after being delayed by a half cycle of the pulse of the Qn output, to the base of the transistor 131 via the resistor 132 for limiting the base current of the transistor 131. Consequently, as long as the output level at the Q terminal of the D type flip-flop 130 is high, the transistor 131 is switched on to discharge the condenser 117 and to prepare for the detecting operation in the next T2. The time at which the transistor 131 is switched on is delayed with the D type flip-flop 130 by a half cycle of the Qn output to prevent misoperation from taking place when the timing of the signal is changed at the D terminal of the D type flip-flops 127 and 128 due to the change of the detected output ((C) in FIG. 2) when the switched on transistor 131 coincides with the change of the pulses delivered to the CLK terminal of the D type flip-flops 127 and 128.

(2) When ambient noise or environmental sound is moderate (as at T2 in FIG. 2):

Because the detected output is lower than the voltage of the constant voltage circuit 118 but higher than the voltage divided with the resistors 119 and 120, the output level of the voltage comparator 121 is low, while that of the output of 122 is high. Thus, the output level ((D) in FIG. 2) of the AND circuit 125 is low and the output level of the output of the inverter 124 is low so that the output level ((E) in FIG. 2) of the AND circuit 126 is also low. Thus, the levels at the D terminals of the D type flip-flops 127 and 128 are low ((D) and (E) in FIG. 2). The reason why the time point at which the level at the D terminal of 128 is later than the starting time of T2 is that the detecting circuits (115, 116 and 117) have a time constant. Because at the end of T2 the levels at the Q terminals ((F) and (G) in FIG. 2) of the D type flip-flops 127 and 128 are low, the level at the S terminal of the analogue switch 104 is low, while the level at the S terminal of the analogue switch 105 is high. Thus, the terminals A and B of the analogue switch 104 are not connected while the analogue terminals A and B of the analogue switch 105 are connected. The output voltage after being divided with the resistors 106 and 107, of the AND circuit 103 is delivered to the input terminal of the amplifier 109. In the same way as from the end of T2 till T3, the AND circuit 103 produces a pulse train which is intermittent with 1 KHz, divided as mentioned above and delivered to the amplifier 109 to be amplified to an output sufficient for driving the sound generator 112. Hereby, because the voltage dividing ratio is small as compared with case (1), the output of the amplifier is large as compared with case (1). Furthermore, the condenser 117 is discharged in the same way as in case (1). Furthermore, in the same way as in case (1) the level at the S terminal of the analogue switch 110 is high from the end of T2 till the beginning of T3, the terminals A and B of the analogue switch 110 are connected, and the sound generator 112 is driven with the output of the amplifier 109 to produce a moderate sound which is louder than that with the basic frequency 1 KHz in the case (1).

(3) When the ambient noise or environmental sound is loud (T3 in FIG. 2):

Because the voltage of the detected output is higher than the voltage of the voltage constant voltage circuit 118 and the voltage divided with the resistors 119 and 120, the levels of the voltage comparators 121 and 122 are high. Thus, the level at the D terminal ((D) in FIG. 2) of the D type flip-flops 125 is high, while the level at the D terminal ((E) in FIG. 2) of the D type flip-flop 126 is low with the output of the inverters 123 and 124. The reason why the point in time at which the level of the D terminal of the D type flip-flop 127 changes from low to high is that the detecting circuits (115, 116 and 117) have a timing constant. Because at the end of the term or period T3 the level at the Q terminal ((F) in FIG. 2) of the D type flip-flop 127 is high and that at the Q terminal ((G) in FIG. 2) of the D type flip-flop 128 is low, the level at the S terminal of the analogue switches 104 and 105 is high. Consequently, the terminals A and B of the analogue switches 104 and 105 are connected and the output of the AND circuit 103 is directly delivered to the amplifier 109. From the end of the term or period T3 till the rising of the Qm wave form, in the same way as in cases (1) and (2), the AND circuit 103 produces a pulse train which is intermittent with 1 KHz and which is directly delivered to the amplifier 109 as mentioned above. Thus, in comparison with cases (1) and (2), the output of the amplifier 109 is the largest.

The condenser 117 is discharged in the same way as in case (1).

Furthermore, in the same way as in cases (1) and (2), the level at the S terminal of the analogue switch 110 is high from the end of the term T3 till the rising of the Qm wave form, the state between the terminals A and B of the analogue switch 110 is conductive and the sound generator 112 is driven with the output of the amplifier 109 so that a sound is generated which is louder than in cases (1) and (2) with the basic frequency of 1 KHz.

In the present embodiment, the amount of ambient noise or environmental sound is divided into three steps which control the sound volume or loudness of the sound generator. However, it is easy to divide the amount of sound into five or ten steps in such a manner that a proper sound volume or loudness can be obtained in accordance with the amount of ambient noise or environmental sound.

In the case of the camera which uses the sound produced intermittently with the built-in sound generator for displaying the operation of the self-timer, the amount of noise or environmental sound around the camera is detected when the sound is not generated during the operation of the self-timer so that a large or high volume of sound is produced when the detected amount is large, while a small sound volume or loudness is produced when the detected amount is low, i.e. when it is quiet. Consequently, the user feels the self-timer operation produces a sound which is almost constant despite the amount of ambient noise or environmental sound. Furthermore, even if the amount of ambient noise or environmental sound varies, the volume or loudness of the sound of the sound generator is automatically changed, which is desirable.

Furthermore, because the sound generator and the noise or environmental sound detecting element are the same, there is the advantage that there is no increase in the manufacturing cost in the present invention when the electrical circuit is integrated.

Figure 3:
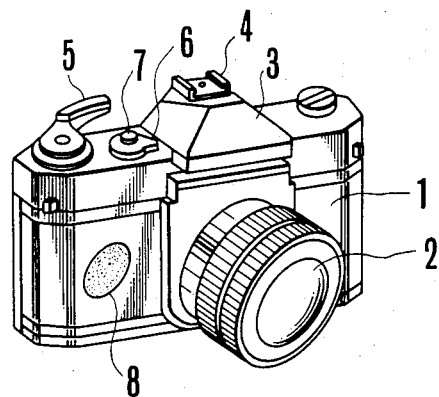
FIG. 3 shows the external appearance of the camera in the second embodiment of the self-timer of the present invention.

FIG. 3 shows in a second embodiment the external appearance of a single lens reflex camera having the self-timer device of the present invention. In the drawing, there is shown a camera body 1, an interchangeable photographing lens 2, an upper cover of the camera body 3, an accessory shoe 4 provided on the upper cover 3, a winding lever 5 and a lever 6 for setting the self-timer device and locking the shutter button. By setting the index on the lever 6 at either of fixed indexes L, A or S on the upper cover 3, the camera can be set with the change over mechanism in the camera when the shutter button is locked, during normal photographing or when the self-timer photographing is ready. A shutter button 7 and a self-timer display sound generator 8 are arranged in close contact with the main body 1.

FIGS. 4(a), (b) and (c) respectively show the positional relation between the fixed indexes L, A and S and the self-timer set lever 6 in FIG. 3. A light emitting diode 9 providing for display purposes assumes the display state to indicate when the self-timer is in operation. In FIG. 3, the lever 6 is hidden. When, as shown in FIG. 4(a), an index 6c on the self-timer set lever 6 coaxially arranged with the shutter button 7 is set at a fixed index L on the upper cover, it becomes impossible to depress the shutter button 7 by means of a change over mechanism (not shown), whereby the shutter button locks. In this case, as shown in the drawing, the light emitting diode 9 is shaded with an end 6a of the self-timer set lever 6 and is not visible. When as is shown in FIG. 4(b) an index 6c of the self-timer set lever 6 is set at the fixed index A, it becomes possible to depress the shutter button 7 by means of a change over mechanism (not shown). When the shutter button 7 is depressed the power source switch (not shown) is closed and when the button 7 is further depressed the switch is closed to carry out normal photography. Also in this case, as is shown in the drawing, the light emitting diode 9 is shaded with the end of the self-timer set lever 6 and is impossible to recognize from outside. When as is shown in FIG. 4(c), the index 6c of the self-timer set lever 6 is set at the fixed index S, a self-timer set switch 12 is closed, as is shown in FIG. 5. In this case, the light emitting diode 9 is not shaded with the end 6a of the self-timer set lever 6, so that the user (the object) can recognize the light.

When the shutter button 7 is now depressed, the power source switch is closed. When the shutter button 7 is further depressed, a self-timer operating switch 11 shown in FIG. 5 is closed in such a manner that normally the sound generator 8 produces intermittent sounds showing that the camera is in the self-timer photographing mode. When ambient noise or environmental sound is large or the distance between the camera and the object is large the sound generator 8 stops generating the sounds and the light emitting diode 9 flickers with the same frequency as that of the sound of the sound generator to show that the camera is in the self-timer mode and after the lapse of a certain predetermined time, the photography operation is automatically carried out.

Figure 8:
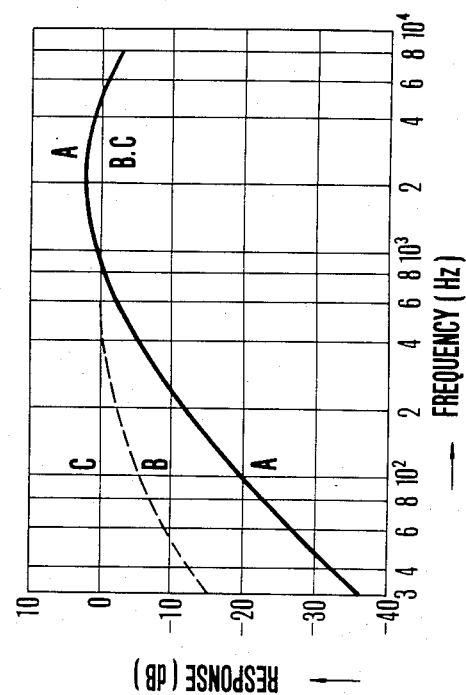
FIG. 8 respectively shows the characteristics of the auditory sense compensating circuit in FIGS. 6(a) and (b).
Figure 9:
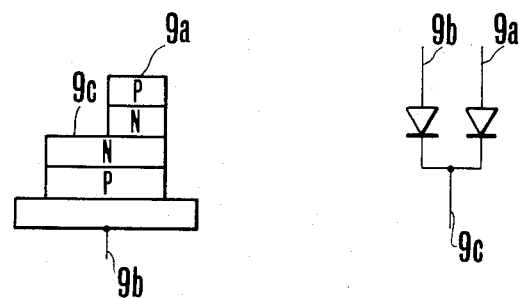
FIG. 9 shows a sketch of the light emitting diode in FIG. 3.

FIG. 5 shows the circuit of the self-timer device in FIG. 3. In FIGS. 5, 8 and 9 are respectively a sound generator, and a light emitting diode in FIGS. 3 and 4.

An oscillator 10 produces clock pulses with 8.192 KHz as the basic frequency to be delivered to a clock input terminal 13a of a counter 13 via the switches 11 and 12. The oscillator 10 consists of inverters $10_1$, $10_2$, resistors $10_3$, $10_4$ and a condenser $10_5$. The self-timer operating switch 11 is closed in operative engagement with the second stroke of the shutter button. The self-timer set switch is closed when the self-timer set lever 6 is set at the index A. The counter 13 divides the frequency of the clock pulses delivered to the clock input terminal 13a for delivering pulses with different divided frequencies from the Q3 terminal. The pulses with 1.024 KHz are delivered from the Q3 terminal, the pulses with 512 Hz from the Q4 terminal, the pulses 1 Hz from the Q13 terminal and the pulses with $\frac{1}{8}$ Hz from the Q16 terminal. The counter 13 stops the frequency dividing operation when a high level (hereinafter called H level) is delivered to a reset terminal 13b, whereby the level at every Q terminal is low (hereinafter called L level). An RS flip-flop 14 consists of NAND gates $14_1$ and $14_2$ and is connected to the reset terminal 13b of the counter 13. An inverter is indicated by the reference numeral 15 and a switch 16 is closed in operative engagement with the winding lever 5 in FIG. 3 and is opened in operative engagement with the running of the rear shutter curtain (not shown). A resistor 17 has one terminal connected to the power source $V_{DD}$. An inverter 18 inverts the output from the Q16 terminal of the counter 13 to be delivered to the RS flip-flop 14. Also shown is AND gate 19, a resistor 20 and an amplifier 21 for amplifying the voltage at the connecting point of the resistor 20 with a transistor 65 to a sufficient level for driving the sound generator 8. The apparatus also includes an analogue switch 22. When the level at its terminal 22c is high, the terminals 22a and 22b are connected. (The same thing can be said of the analogue switches, namely the level at a terminal c is high, the terminals a and b are connected). An analogue switch 23 and the sound generator 8 consists of a piezoelectric buzzer and an electromagnetic speaker, which also acts as a microphone. Also shown are an analogue switch 25, an inverter 26 and an amplifier 27 amplifying the signal picked up with the sound generator 8 acting as a microphone.

A BBD 28 (Bucket Brigade Device) of 512 steps, whereby the analogue signal delivered from the amplifier 27 to the terminal is delayed in synchronization with the two phase clocks in reversed phase delivered to terminals 28a and 28b and delivered from a terminal 28d. Also shown are an inverter 29, an operational amplifier 30 and resistors 31, 32, 33. Numeral 34 identifies an auditory sense compensating circuit A having a characteristic curve A shown in a solid line in FIG. 8. Numeral 35 identifies an auditory sense compensating circuit B having a characteristic curve B shown in a dotted line in FIG. 8. Numeral 36 identifies an auditory sense compensating circuit C having a characteristic curve C shown in a solid line in FIG. 8. Also shown are analogue switches 37, 38, 39, diode 40, a resistor 41 and a condenser 42, which collectively constitute an average value detecting circuit. A resistor is identified by the reference numeral 43 and an operational amplifier 44 is used as a buffer amplifier in follower connection. A constant voltage circuit 45 delivers a constant voltage to a resistor 46, an information resistor 54, and a resistor 66. Resistors 46-48 constitute a voltage dividing circuit of the constant voltage circuit 45. Comparators 49 and 50 compare the voltage at the connecting point of the resistors 46 and 47 and with that at the connecting point of the resistors 47 and 48. Numeral 51 identifies an AND gate, 52 a NOR gate and 53 a NOR gate. The information resistor 54 is operatively engaged with the distance ring provided on the circumference of the lens 2 and the voltage of a variable terminal 54a varies continuously with adjustment from close up to infinity. More particularly, the nearer the distance is, the higher the voltage is. An operational amplifier 55 acts as a buffer amplifier in follower connection. An operational amplifier 56 and resistors 57 and 58 invert the output of the operational amplifier 55. An operational amplifier 59 and resistors 60 to 63 are provided for calculating the outputs of the operation amplifiers 44 and 56. A resistor 64 and a transistor 66 are arranged whereby the voltage of the output of the AND gate 19 is divided with the resistor 20 and the impedance between the collector and the emitter of the transistor 65. Resistors 66 and 67 divide the voltage of the constant voltage circuit 45. Numerals 68 to 70 identify comparators, 71 and 72 inverters, 73 an AND gate, 74 and 75 OR gates, 76 an analogue switch, 77 an inverter, and 78 and 79 AND gates. The light emitting diode 9 consists of two light emitting diodes $9_1$ and $9_2$, whereby the color of the light is variable. Namely, the light emitting diode $9_1$ is a green light emitting diode, while $9_2$ is a red light emitting diode. Numerals 9a, 9b and 9c are the three terminals of the light emitting diode 9, more specifically 9a and 9b are for the anode and 9c for the cathode.

The operation of the above construction will be explained below in conjunction with FIGS. 3-5 and FIG. 10.

Setting the self-timer set lever as is shown in FIG. 4(c), closes the self-timer switch 12. Operating the winding lever 5 closes the switch 16. When the shutter button 6 is depressed the power source switch (not shown) is closed to deliver power to every part. When the shutter button 6 is further depressed, the self-timer operation switch 11 is closed and pulses with the basic frequency of 8.192 KHz are delivered from the oscillator 10 to the clock input terminal 13a of the counter 13. Because the switch 16 is closed when the film has been wound, the level at the connecting point of the switch 16 with the resistor 17 is low (L level). Namely the level of an input terminal of the NAND gate $14_1$ of the RS flip-flop 14 is low (L level), so that the output level is high (H level). Furthermore, because the output level of the NAND gate $14_1$ is high (H level), the output level of the inverter 15 is high (H level) and the output level of the inverter 18 is high (H level) (until the level at the Q16 terminal of the counter 13 varies from low to high). The output level of the NAND gate $14_2$ becomes low and that at the reset terminal 13b of the counter 13 becomes low, namely the counter 13 starts the clock operation. Consequently, the AND gate 19 produces the product wave forms from the Q3 and the Q13 terminals namely the pulses intermittent with 1.024 KHz (about 1 KHz) for $\frac{1}{2}$ second and with L level for the next $\frac{1}{2}$ second alternatively. (The wave form is the same as that shown in FIG. 10(A) with reference to time). When the level at the Q16 changes from low to high, namely after the lapse of 8 seconds after the counter 13 starts to clock, the level of the inverter 18 becomes low, so that the output level of the NAND gate $14_2$ of the RS flip-flop 14 and that at the reset terminal of the counter 13 becomes high to stop the clock operation of the counter 13. Consequently, for this 8 seconds the self-timer operates, whereby the second generator 8 generates the sounds or the light emitting diode flickers if the distance to the object is large. Furthermore, with the level change at the Q16 terminal of the counter 13 as the trigger, the leading shutter control device (not shown) operates to allow the leading shutter curtain (not shown) to run. The operation of the self-timer in the eight seconds after the start of the counter 13 will be explained below.

As mentioned above, pulses with the basic frequency of about 1 KHz are delivered from the Q3 terminal via the AND gate 19, while the level at the Q13 terminal of the counter remains high, to the amplifier 21 via the resistor 20. The pulses, which have been properly amplified in the amplifier 21 (FIG. 10(A)), are delivered to the terminal 22a of the analogue switch 22. Hereby, because the terminal 22c of the analogue switch 22 is connected to the Q13 terminal of the counter 13, the area between the terminals 22a and 22b of the analogue switch is conductive, while the pulses of 1 KHz are produced in the AND gate 19 so that the output of the amplifier 21 appears at the terminal 22b of the analogue switch 22. Although the output is delivered to a terminal 23a of the analogue switch 23, it depends upon the level at a terminal 23c whether the output is applied to the sound generator 8. Because the terminal 23c is connected to the inverter 77, while the input of the inverter 77 is connected to the output of the comparator 68, it depends upon the level of the comparator 68 whether the area between the terminals 23a and 23b of the analogue switch 23 is conductive. The level of the output of the comparator 68 will be explained later. Consequently, when the level at the terminal 23c of the analogue switch 23 is high, the output voltage of the amplifier 21 is applied to the sound generator 8, which generates pulses intermittent with the basic frequency of 1 KHz at the interval of ½ second for 8 seconds, while the self-timer is in operation. The sound generator 8 acts as a microphone for the remaining ½ second. Namely, the signals with the phases inverted with the inverter 26 are put into the terminal 22c of the analogue switch 22 and a terminal 25c of the analogue switch 25, while the analogue switch 23 conducts the signal (corresponding to the environmental sound or noise around the camera) from the sound generator 8 acting as a microphone, is delivered to the amplifier 27 via the analogue switch (because the area between terminals 25a and 25b is conductive). The amplifier 27 amplifies properly a voltage corresponding to the environmental sound or noise around the camera from the sound generator 8. The wave form of the analogue signal is shown in FIG. 10(B). The output of the amplifier 27 is delivered to the BBD28 and the resistor 21. To the terminals 28a and 28b of the BBD28, pulses are input with the basic frequency 512 Hz with the phases reversed in the inverter 29, whereby the relation between the delay time of the BBD28 and the clock frequency is $$t_D = (N/2f_{cp})$$

$t_D$: signal delay time
$f_{cp}$: clock frequency
N: number of transfer steps

Figure 6:
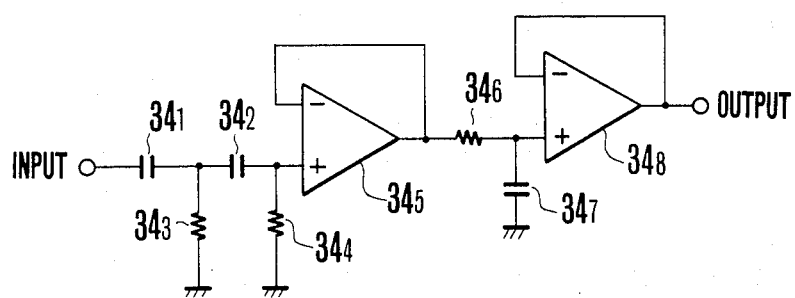
FIG. 6(a) shows, in detail, an auditory sense compensation circuit A in FIG. 5.
FIG. 6(b) shows, in detail, the auditory sense compensation circuit B in FIG. 5.
Figure 6:
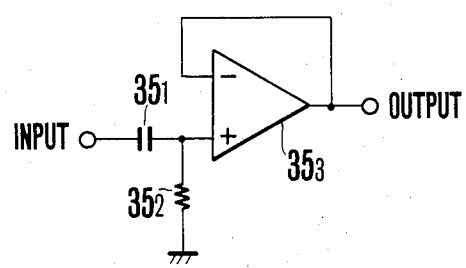
Figure 7:
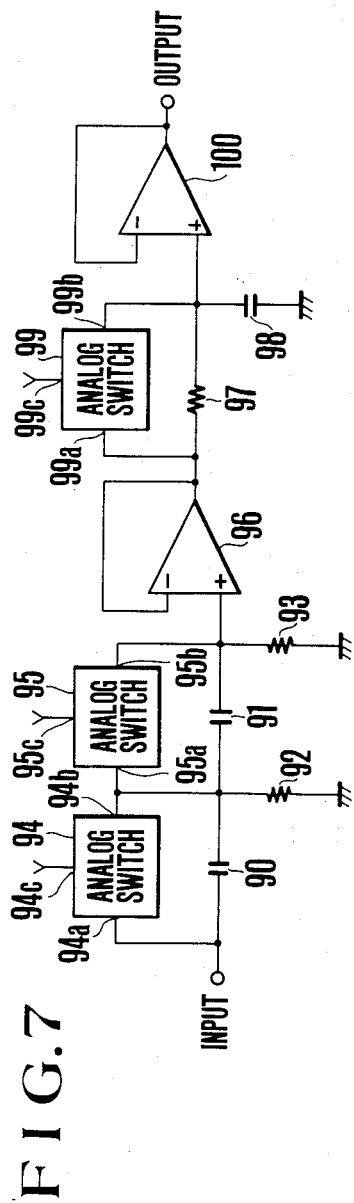
FIG. 7 shows a circuit of the three kinds of auditory sense compensating circuits in FIG. 3 as a whole.
Figure 10:
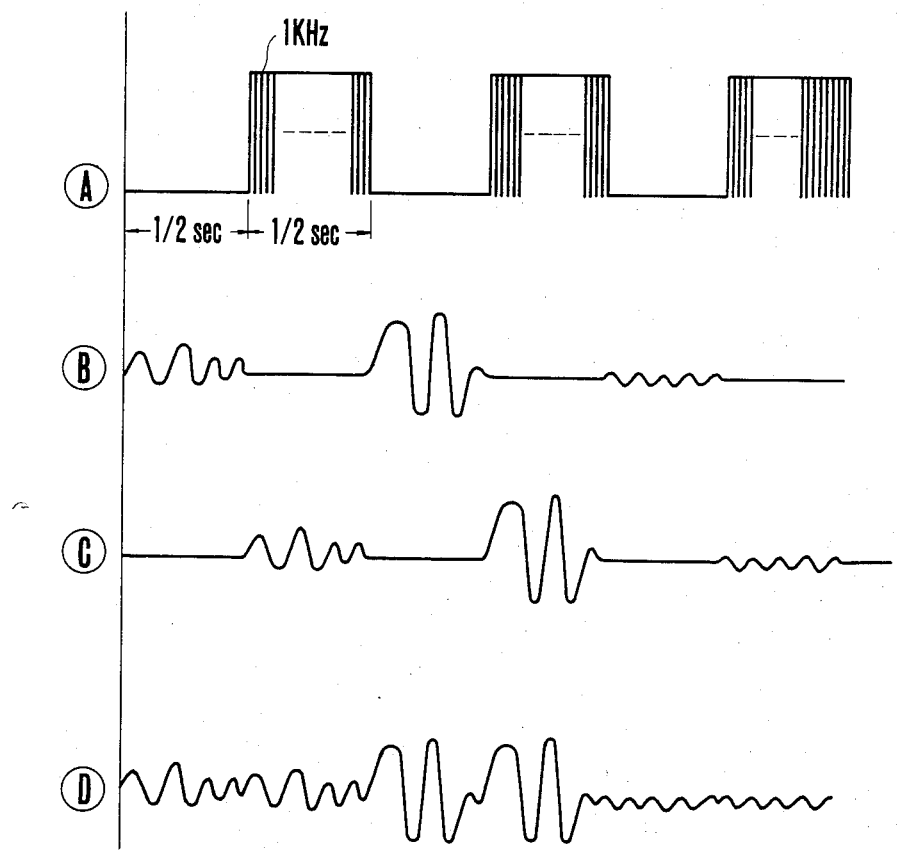
FIG. 10 shows the frequency characteristic of the circuit in FIG. 5.

Thus, the signal delay time $t_D$ of the BBD28 with N=512 steps is ½ second. Namely, the voltage wave form in FIG. 10(B) is delayed by ½ second, as shown in FIG. 10 (C). The signals in FIG. 10(B) and FIG. 10(C) are added and inverted in the resistors 31–33 and the operational amplifier 30 into the signal in FIG. 10(D), whose wave form is represented with the composite wave forms in FIGS. 10(B) and (C). The voltage wave form in FIG. 10(D) is inverted in phase. As is clear from the wave form, different from the voltage wave form in FIG. 10(B), the wave form is continuous so that freedom for processing the following signal is largely increased. The signal in FIG. 10(D) is delivered to three kinds of auditory sense compensation circuits, namely a circuit A34 having a curve A, B35 having a curve B and C36 having a straight line C. The frequency characteristics of each auditory sense compensation circuit is as shown in FIG. 8. By means of these auditory sense compensation circuits 34–36, the sound volume or loudness picked up with the sound generator 8 around the camera can be measured with characteristics similar to the auditory sense. Furthermore, in accordance with the level of ambient noise or environmental sound one of three kinds of characteristics is selected with the analogue switches 37–39. More particularly, when the ambient noise or environmental sound is below 60 dB (0 db=0.0002 μbar) the curve A is selected, when the ambient noise or environmental sound is between 60–85 dB, the curve B is selected, and when the ambient noise or environmental sound is above 85 dB the straight line C is selected with the constant voltage circuit 45, the resistors 46–48, the comparators 49 and 50, the AND gate 51, the NOR gates 52 and 53 and the analogue switches 37–39. Three kinds of auditory sense compensation circuits 34–36, having the characteristics in FIG. 8, will be explained in greater detail. FIG. 6(a) shows the auditory sense compensation circuit A34, while FIG. 6(b) shows the auditory sense compensation circuit B35. In FIG. 6(a), numerals $34_1$, $34_2$ and $34_7$ identify condensers, $34_1$, $34_4$ and $34_6$ identify resistors and $34_5$ and $34_8$ identify operational amplifiers acting as buffer amplifiers. Namely, in FIG. 6(a), the condensers $34_1$ and $34_2$ and the resistors $34_3$ and $34_4$ constitute a secondary high pass filter, while the resistor $34_6$ and the condenser $34_7$ form a primary low pass filter to present characteristics shown with the curve A in FIG. 8. Furthermore, in FIG. 6(b), numeral $35_1$ identifies a condenser, $35_2$ a resistor and $35_3$ an operational amplifier acting as a buffer amplifier, whereby the condenser $35_1$ and the resistor $35_2$ constitute a primary high pass filter presenting characteristics shown with the curve B in FIG. 8. Furthermore, as is clear from FIG. 8, the straight line C has a flat frequency characteristic so that the input and the output of the auditory sense compensation circuit C36 are short-circuited. The signals which have passed the auditory sense compensation circuits 34–36 are respectively delivered to the analogue switches 37–39. Only one of the switches is selected with the AND gate 51, and NOR gates 52 and 53. Namely, the output signal of the operational amplifier 30 is compensated in the auditory sense with one of the characteristics A, B and C and applied to the anode of the diode 40. The diode 40, the resistor 41 and the condenser 42 constitute an average value detecting circuit, which detects the compensated output of the operational amplifier 30 delivered to the positive phase input terminal of an operational amplifier 44. Hereby, the resistor 41 and the condenser 42 decide the attack time since a signal appears at the cathode of the diode 40 till a transistor 65 begins being controlled, while the condenser 42 and the resistor 43 decide the recovery time since the signal at the cathode of the diode 40 disappears till the transistor 65 is no longer controlled. The signal which has been detected in the average value on the basis of the attack time and the recovery time proper, as above, is delivered from the output of the operational amplifier 44 to the positive input terminal of the comparators 49 and 50 and to the resistor 61. Below, the operation of the comparators 49 and 50 will be explained. The output voltage of the operational amplifier 44 is compared with the voltage divided with the resistors 46–48 of the constant voltage circuit 45 with the comparators 49 and 50. The voltage dividing level of the resistors 46–48 corresponds to the output voltage of the operational amplifier 44 corresponding to the level of environmental sound or noise around the camera in such a manner that the level at the connecting point of the resistors 47 and 48 corresponds to the noise level of 60 dB, while that of the connecting point of the resistors 46 and 47 corresponds to the noise level of 85 dB. Because the voltage at the positive input terminal of the comparators 49 and 50 is zero before no output voltage appears in the operational amplifier 44 immediately after the power source switch is closed, the output level of the comparators 49 and 50 is low. Consequently, the output level of the NOR gate 52 is high so that the level of voltage at the terminal 37c of the analogue switch 37 is high, and the area between the terminals 37a and 37b is conductive, namely the signal of the auditory sense compensating circuit A34 is applied to the anode of the diode 40 and an average voltage value appears at the output of the operational amplifier 44. The voltage is again compared with the voltage divided with the resistors 46–48 in the comparators 49 and 50, whereby when the level of environmental sound or noise around the camera is below 60 dB, the output levels of the comparators 49 and 50 remain low and the auditory sense compensation curve A remains selected. On the other hand, when the noise level is above 60 dB (but below 85 dB), the level of the comparator 49 is low, while the level of the comparator 50 is high. Then, the level of the NOR gate 52 is low, the level of the AND gate 51 is low and the level of the NOR gate 53 is high so that the terminals 38a and 38b of the analogue switch 38 are connected and the auditory sense compensating curve B is selected. When the noise level exceeds 85 dB, the levels of the comparators 49 and 50 are high, that of the AND gate 51 is high and that of the NOR gates 52 and 53 is low so that the auditory sense compensating curve C is selected. As mentioned above, the level of environmental sound or noise around the camera appears at the output of the operational amplifier 44 through the auditory sense compensation circuit which corresponds to the level. Namely, the operational amplifier 44 produces a voltage corresponding to the noise level sensibility of the human ears. In FIG. 5, only one of the three auditory sense compensating circuits 34–36 is selected with the analogue switches 37–39, while FIG. 7 shows a more simplified method. In FIG. 7, these three auditory sense compensating circuits are unified. In the drawing, numerals 90 and 91 identify condensers, 92 and 93 resistors, 94 and 95 analogue switches, 96 an operational amplifier acting as a buffer amplifier, 97 a resistor, 98 a condenser, 99 an analogue switch and 100 an operational amplifier acting as the buffer amplifier. When the levels at terminals 94c, 95c and 99c of the analogue switches 94, 35 and 99 are low, the terminals 94a and 94b, the terminals 95a and 95b and the terminals 99a and 99b are not connected, whereby the circuit becomes the same as the auditory sense compensating circuit having the curve A in FIG. 6(a). When the levels at the terminals 94c and 99c of the analogue switches 94 and 99 are low and the level at the terminal 95c of the analogue switch 95 is low, the respective terminals 94a and 94b and the terminals 99a and 99b of the analogue switches 94 and 99 are connected, whereby the circuit becomes the same as the auditory sense compensating circuit having the curve B in FIG. 6(b) with a resistor connected between the input and the ground. However, the output of the operational amplifier 30 in FIG. 5 is connected to the input terminal, the impedance is sufficiently low, and the resistor is negligible. When all the levels at the terminals 94c, 95c and 99c of the analogue switches 94, 95 and 99 are high, all the analogue switches become conductive and the signals applied to the inputs appear at the outputs via the operational amplifiers 96 and 100 which act as the buffer amplifiers. Namely, the auditory sense compensation straight line C is selected.

By applying the outputs of the comparators 49 and 50 in FIG. 5 to the terminals 94c, 95c and 99c of the analogue switches 94, 95 and 99 to carry out the above operation, the auditory sense compensation circuit 34–36 in FIG. 5 and the analogue switches 37–39 can be substituted for the circuit in FIG. 7. Before describing the resistor 61, to which the output of the operational amplifier 44 in FIG. 5 is connected, description will be given on the signal to be applied from the operational amplifier 56 to the resistor 60. The voltage of the constant voltage circuit 45 is applied to the information resistor 54 of the lens distance ring. The closer the lens distance ring is to a very near distance, the higher the voltage is at a variable terminal 54a of the information resistor 54, while the closer the lens distance ring is to an infinite distance, the lower the voltage is. Consequently, the voltage appears at the output of the operational amplifier 55 and is inverted and amplified with the resistors 57 and 58, and the operational amplifier 56. Namely, the closer one gets to an infinite distance, the larger the output of the operational amplifier 56. The output voltage of the operational amplifier 56 and that of the operational amplifier 44 are calculated with the resistors 60, 61 and 63 and the operational amplifier 59. The resistor 62 shifts the level. Thus, the lower the output voltage of the operational amplifier 44 or that of 56, the higher the output voltage of the operational amplifier 59, so that the base current of the transistor 65 is increased via the resistor 64 and the impedance between the collector and the emitter of the transistor 65 is decreased. Namely, the voltage dividing ratio of the resistor 20 to the impedance between the emitter and the collector of the transistor 65 for dividing the output of the AND gate 19 is decreased and the voltage to the amplifier 21 is decreased. Furthermore, when the terminals 23a and 23b of the analogue switch 23 are connected, the voltage applied to the sound generator 8 is decreased and the self-timer operation display sound of the sound generator 8 becomes low. In other words, the level of noise or environmental sound around the camera is low, so that the output voltage of the operational amplifier 44 is low and the distance between the object and the camera is small. Namely, the lens distance ring is set toward a very near distance so that the output voltage of the operational amplifier 56 is low, and the self-timer operation display sound of the sound generator 8 is low. On the other hand, when the level of environmental sound or noise around the camera is large or the distance between the object and the camera is large so that the lens distance ring is set toward infinity, the self-timer operation sound of the sound generator 8 is large. Furthermore, inbetween the above two cases, the sound volume level or loudness of the sound generator 8 is adjusted properly in accordance with the level of noise or environmental sound around the camera and the lens distance ring set positon. Namely, the sound volume or loudness of the sound generator 8, during the operation of the self-timer, is always proper at the position of the object in accordance with the ambient noise or environmental sound and the distance to the camera. So far an explanation has been made for the case when the level at the terminal 23c of the analogue switch 23 is high. How the level at the terminal 23c is decided will be explained below. To the negative input terminal of the comparator 68, the output of the operational amplifier 59 is connected so as to be compared with the voltage divided with the resistors 66 and 67 of the constant voltage circuit 45, whereby when the output voltage of the operational amplifier 59 is higher, the level of output of the comparator 68 is low and the level of the inverter 77 is high, so that the area between the terminals 23a and 23b of the analogue switch 23 is conductive and the sound generator 8 issues sound. However, when the output voltage of the operational amplifier 59 is lower than the voltage at the connecting point of the resistors 66 and 67, the output level of the comparator 68 is high and the output level of the inverter 77 is low so that the terminals 23a and 23b of the analogue switch 23 are not connected and the sound generator 8 does not issue any sound, even during the operation of the self-timer. In this case, the output level at the terminal 76c of the analogue switch 76 is high, the terminals 76a and 76b are connected and the light emitting diode 9 flickers instead of sound being generated by the sound generator 8. Namely, when the output voltage of the operational amplifier 59 is lower than a certain determined value, the self-timer operation display element is changed over from the sound generator 8 to the light emitting diode 9. In other words, when the level of environmental sound or noise around the camera is so large that it is impossible to recognize the sound of the sound generator at the position of the object or the distance between the camera and the object is so large that it is impossible to recognize the sound or both of the levels of environmental sound or noise and the distances are so large that it is impossible to recognize the sound, the self-timer display element is changed from the sound generator 8 to the light emitting diode 9 in such a manner that the self-timer operation is visually recognized. Furthermore, in the present embodiment, it is possible to confirm with the color of the diode 9 why the self-timer operation display element is changed over from the sound generator 8 to the light emitting diode 9. The light emitting diode 9 is a variable color light emitting diode, as is shown in FIG. 9.

Figure 4:
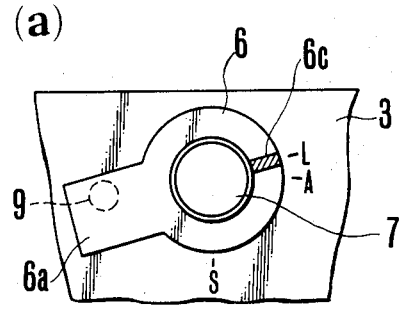
FIGS. 4(a), (b) and (c) respectively show the positional relation between the self-timer set lever in FIG. 3 and the fixed index, whereby.
FIG. 4(b) shows the relation when the normal photographing mode is set.
FIG. 4(c) shows the relation when the self-timer mode is set.
Figure 4:
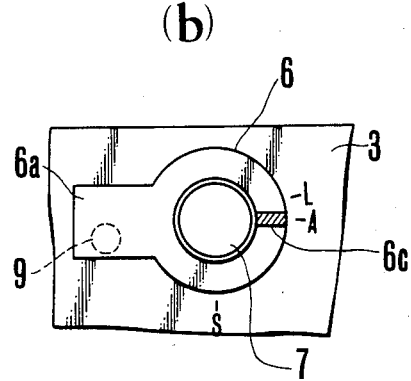
Figure 4:
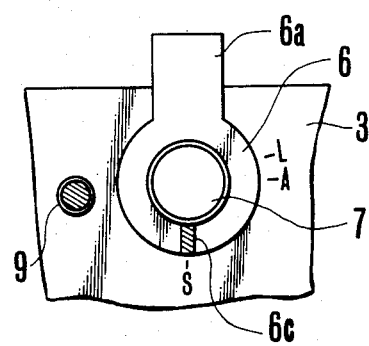
Figure 5:
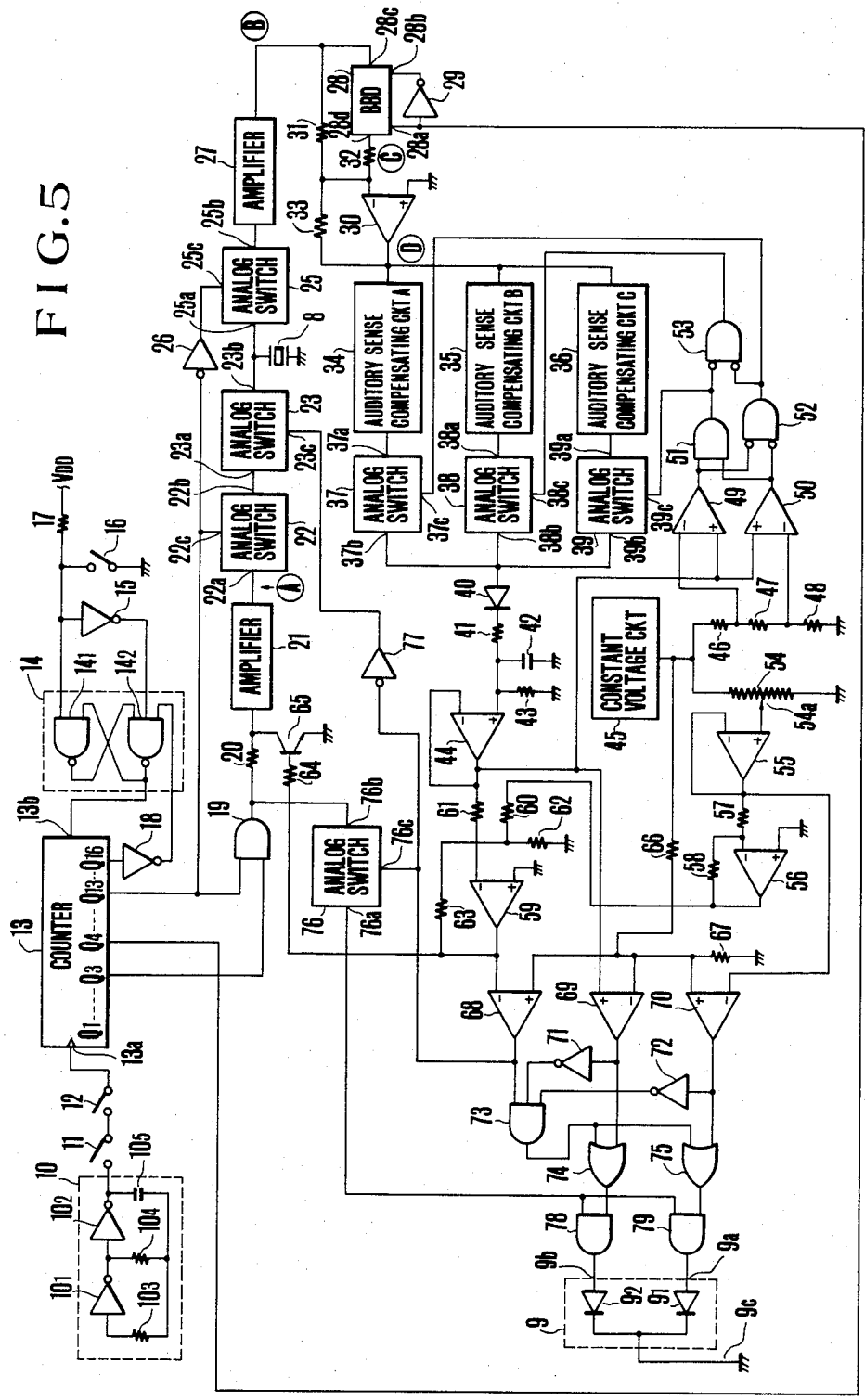
FIG. 5 shows the self-timer circuit of the camera in FIG. 3.

FIG. 9 shows a sketch and an equivalent circuit of the light emitting diode in FIGS. 3 to 5. The element is a GaP single pellet type variable color light emitting diode having both green light emitting and red light emitting parts. The green light is emitted when the current flows from 9a to 9c, while the red light is emitted when the current flows from 9b to 9c. When the current flows from 9b and 9a to 9c, the yellow light is emitted. As mentioned above, the comparator 68 produces a high level output when it is impossible to confirm the sound of the sound generator 8, regardless of the reason. The comparator 69, to whose positive input terminal the output of the operational amplifier 44 is connected, compares the output with a certain determined voltage to produce a high level output when environmental sound or noise around the camera is so great that it is impossible to confirm the sound of the sound generator at the position of the object. The comparator 79, to whose positive input terminal the output of the operational amplifier 55 is connected, compares the output with a certain determined voltage to produce a high level output when the distance between the camera and the object is so great that it is impossible to confirm the sound of the sound generator 8. The four cases in which the output of the operational amplifier 58 is lower than a certain determined voltage and the level of the comparator 68 becomes high will be explained below.

(i) Because, when environmental sound or noise around the camera is so great that the output levels of the comparators 68 and 69 are high the output level of the comparator 70 is low, the output level of the AND gate 73 is low, the output level of the OR gate 74 high and the output level of the OR gate 75 low. Because the output of the AND gate 19 is delivered to the input of the AND gates 78 and 79 via the analogue switch 76, only the output of the AND gate 19 is delivered to the input of the AND gates 78 and 79 via the analogue switch 76, only the output of the AND gate 78 is the same as the signal of the AND gate 19. Namely, element $9_2$ of the light emitting diode 9 flickers with red light at the interval of $\frac{1}{2}$ second (with 1 KHz).

(ii) When the distance between the camera and the object is too great, the output levels of the comparators 68 and 70 are high and the output level of the comparator 69 is low. Thus, the output level of the AND gate 73 is low, the output level of the OR gate 74 is low and the output level of the OR gate 75 is high so that element $9_1$ of the light emitting diode 9 flickers with green light at the interval of $\frac{1}{2}$ second.

(iii) When cases (i) and (ii) take place at the same time, all the output levels of the comparators 68–70 are high. Thus, the output level of the AND gate 73 is low, and the output levels of the OR gates 74 and 75 are high, so that the elements $9_1$ and $9_2$ of the light emitting diode 9 flicker with yellow light at the interval of $\frac{1}{2}$ second.

(iv) When environmental sound or noise around the camera and the distance between the camera and the object are beyond a limited value in combination and it is impossible to confirm the sound of the sound generator 8 at the position of the object, the output level of the comparator 68 is high and the output levels of the comparators 69 and 70 are low. Thus, the output level of the AND gate 73 is high and the output level of the AND gate 74 is high so that in the same way as in the case (iii), the elements $9_1$ and $9_2$ of the light emitting diode 9 flicker with green light at the interval of $\frac{1}{2}$ second.

By setting the camera to the operation of the self-timer and depressing the release button down in a second stroke, the self-timer starts to operate. In this case it is possible to confirm the sound of the sound generator as the display element at the object, the sound generator is used in such a manner that sound volume or loudness is controlled in accordance with ambient noise or environmental sound and the distance between the camera and the object so that a certain predetermined sound volume or loudness is obtained at the object. Furthermore, if the ambient noise or environmental sound level is increased to such a great level that it is impossible to hear the sound of the sound generator, the display element of the self-timer is changed over from the sound generator to the light emitting diode, which flickers with a red light to tell the user that ambient noise or environmental sound is great. If the distance between the camera and the object is large and it is impossible to hear the sound of the sound generator, the display element is changed over to the light emitting diode, which flickers with a green light to tell the user that the distance between the camera and the object is great. When both ambient noise or environmental sound level and the distance between the camera and the object or the ambient noise or environmental sound and the distance in combination are beyond a limit and it is impossible to hear the sound of the sound generator, the display element is changed over to the light emitting diode, which flickers with a yellow light to tell the user that the noise level and the distance between the camera and the object is not the only cause. When the self-timer operation with the sound generator and the light emitting diode is terminated, the shutter of the camera operates to start the exposure.

Although in the present embodiment, the distance information between the camera and the object is obtained with the voltage from the variable resistor in operative engagement with the lens distance ring, the present invention is not limited to the above, whereby it is possible to use as distance information the distance signal from the automatic focusing system for controlling the lens position, as in case of the automatic focusing camera.

As explained above in detail in accordance with the present embodiment, it is possible to obtain a proper sound volume or loudness corresponding to ambient noise or environmental sound and the object distance by detecting the level of sound or environmental noise around the camera and controlling the volume or loudness of the sound of the sound generator in accordance with the detected amount or distance between the camera and the object.

Furthermore, in accordance with the present invention, because the level of ambient noise or environmental sound is detected and when the detected amount is beyond a certain limit value, the self-timer operation display element is changed over from the sound generator to the light emitting element by changing the analogue switch so that self-timer operation can be visually confirmed. The operation of the self-timer can be displayed effectively with any level of ambient noise or environmental sound.

Furthermore, in accordance with the present embodiment, the level of ambient noise or environmental sound and the set position of the lens distance ring are detected electrically and when both or either one is beyond a certain limited value, the self-timer operation display element is changed over from the sound generator to the light emitting element by changing the analogue switch so that the self-timer operation can be confirmed visually.

Furthermore, by changing the color of the light emitting diode, it is possible to alarm the user as to the reason why the self-timer operation display element is changed over from the sound generator to the light emitting element.

Furthermore, in accordance with the present embodiment when applying the output signal of ambient noise or environmental sound picked up with the sound generator used as the microphone to the auditory sense compensation circuit, the signal becomes similar to the human auditory sense and the sound volume or loudness of the sound generator can be correctly controlled with the signal.

Although in the above first embodiment, the volume or loudness of the sound of the sound generator is controlled in three steps with the voltage dividing with the resistors and the analogue switches, the three stages are not sufficient because of the dynamic range of the noise. However, if the number of steps for controlling the sound volume or loudness is inverted, the number of the elements is increased and the wiring is also increased so that the circuit becomes complicated.

On the other hand, the present embodiment, when composing the ambient noise or environmental sound picked up with the sound generator with the delayed noise signal and continuously controlling the voltage to be applied to the sound generator by means of the composed voltage, the sound volume or loudness of the sound generator can be controlled to sufficiently correspond to the level of ambient noise or environmental sound, the sound volume or loudness of the sound generator can sufficiently be controlled to correspond to the level of ambient noise or environmental sound with a simple circuit composition.

Furthermore, the present invention is not limited to the normal photography camera but can be applied to various other cameras such as the magnetic disc camera, the video camera, the still video camera, the motion picture camera and so on, so that many new effects can be expected from application to those cameras.

What is claimed is:

1. For a camera having a self-timer, a device which displays the operation of the self-timer comprising:
   (a) sound generating means for producing sound while the self-timer is in operation;
   (b) light emitting means for emitting the light for displaying the operation of the self-timer;
   (c) detecting means for detecting the level of the environmental noise;
   (d) set means for setting predetermined noise level; and
   (e) control means for driving the light emitting means for displaying the operation of the self-timer when the level of the environmental noise detected by the detecting means is larger than the predetermined noise level set by the set means.

2. A device according to claim 1, wherein said sound generating means and said detecting means each have members in common.

3. A device according to claim 1, wherein the detecting means comprises:
   (a) converting means for converting the level of the environmental noise into an electrical signal; and
   (b) an auditory sense compensating circuit for compensating for the level of the environmental noise converted into an electrical signal by the converting means and producing an electrical signal corresponding to the level of the noise sensible to human ears.

4. For a camera with a self-timer, a device which displays the operation of the self-timer comprising:
   (a) sound generating means for producing sound while the self-timer device is in operation;
   (b) light emitting means for emitting the light for displaying the operation of the self-timer;
   (c) detecting means for detecting the level of the environmental noise;
   (d) set means for setting a predetermined noise level; and
   (e) control means for driving the light emitting means, and prohibiting the drive of the sound generating means where the level of the environmental noise detected by the detecting means is larger than the predetermined noise level set by the set means.

5. A device according to claim 4, wherein said sound generating means and said detecting means each having members in common.

6. A device according to claim 4, wherein the detecting means comprises:
   (a) converting means for converting the level of the environmental noise into an electric signal; and
   (b) an auditory sense compensating circuit for compensating for the level of the environmental noise converted into an electrical signal by the converting means by setting a electrical signal corresponding to a level of noise sensible to human ears.

7. A device as in claim 4, wherein said detecting means comprises:
   converting means for converting the level of the environmental noise into an electrical signal; and
   a compensating circuit for setting the amplitude of the electrical signal of said converting means on the basis of the environmental noise.

8. An indicating device for a camera comprising:
   (a) audible indicating means for audibly indicating an information for photography;
   (b) visual indicating means for visually indicating the same kind of said photography information;

(c) detecting means for detecting a level of ambient sound; and
(d) determining means for determining whether said audible indicating means is activated or not and at the same time determining whether the visual indicating means is activated or not based on the result of detection by said detecting means.

9. An indicating device for a camera according to claim 8, wherein said information for photography is information for a self-timer.

10. An indication device for a camera comprising:
(a) audible indicating means for audibly indicating an information for photography;
(b) visual indicating means for visually indicating the same kind of photography information;
(c) detecting means for detecting an ambient sound;
(d) control means for activating said visual indicating means depending on the result of detection by the detecting means.

11. An indication device for a camera according to claim 10, wherein the control means activates the visual indicating means when the ambient sound is detected to be at a prescribed level or higher by said detecting means.

12. An indication device for a camera comprising:
(a) audible indicating means for audibly indicating an information for photography;
(b) visual indicating means for visually indicating the same kind of photography information;
(c) detecting means for detecting an ambient sound; and
(d) control means for inhibiting the operation of said audible indicating means depending on the result of said detecting means.

13. An indication device for a camera according to claim 12, wherein said control means inhibits the operation of the audible indicating means when the ambient sound is detected to be at a prescribed level or higher by said detecting means.

14. An indication device for a camera according to claim 11 or 13, wherein said audible indicating means and the visual indicating means indicate a self-timer operation state.

15. An indication device for a camera comprising:
(a) audible indicating means for audibly indicating an information for photography;
(b) visual indicating means for visually indicating an information for photography;
(c) detecting means for detecting a level of ambient sound; and
(d) a determining circuit for determining whether the audible indicating means is activated or not and at the same time determining whether the visual indicating means is activated or not based on the result of detection by said detecting means.

* * * * *